Sept. 29, 1970

E. B. TICKELL 3,531,762

DEPTH CONTROLLERS FOR SEISMIC STREAMER CABLES

Filed Dec. 26, 1968

Edward B. Tickell
INVENTOR

BY Michael P. Breston

ATTORNEY

Sept. 29, 1970  E. B. TICKELL  3,531,762
DEPTH CONTROLLERS FOR SEISMIC STREAMER CABLES
Filed Dec. 26, 1968  3 Sheets-Sheet 2

Edward B. Tickell
INVENTOR

BY Michael P. Breston

ATTORNEY

Sept. 29, 1970   E. B. TICKELL   3,531,762
DEPTH CONTROLLERS FOR SEISMIC STREAMER CABLES
Filed Dec. 26, 1968   3 Sheets-Sheet 3
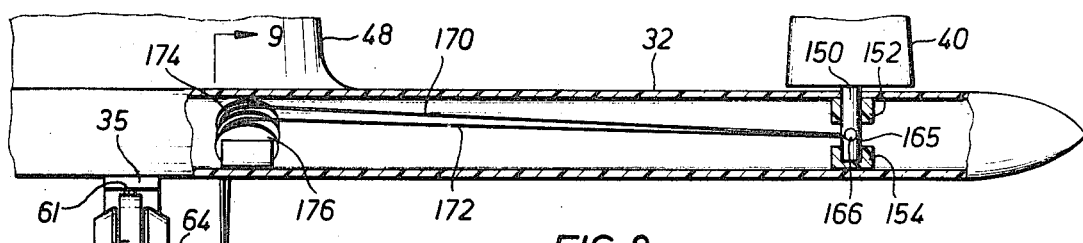
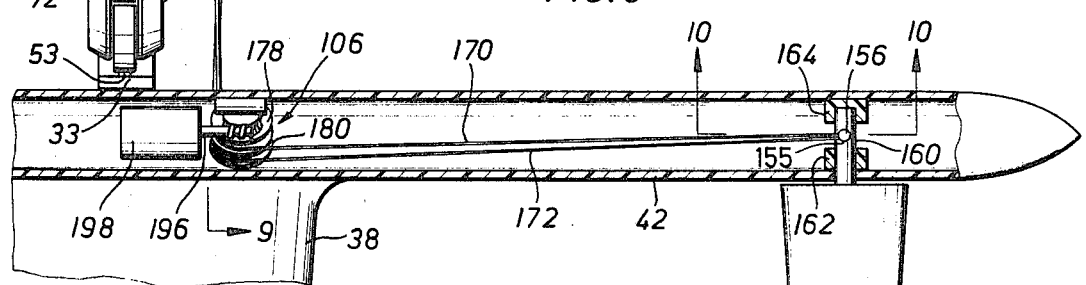
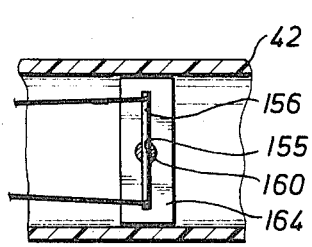
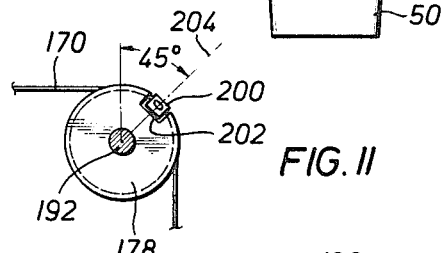
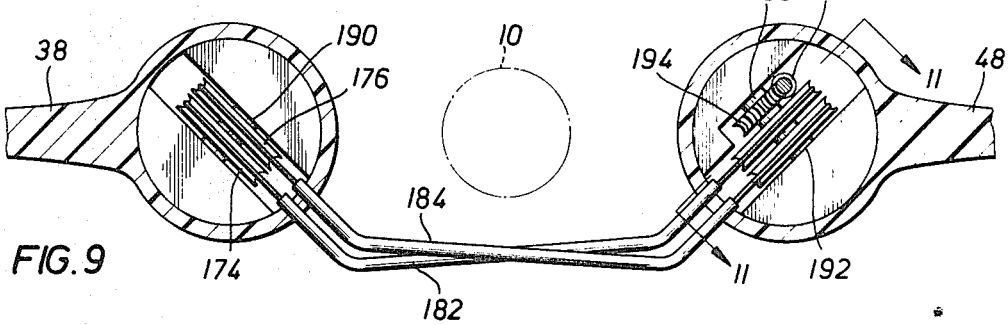
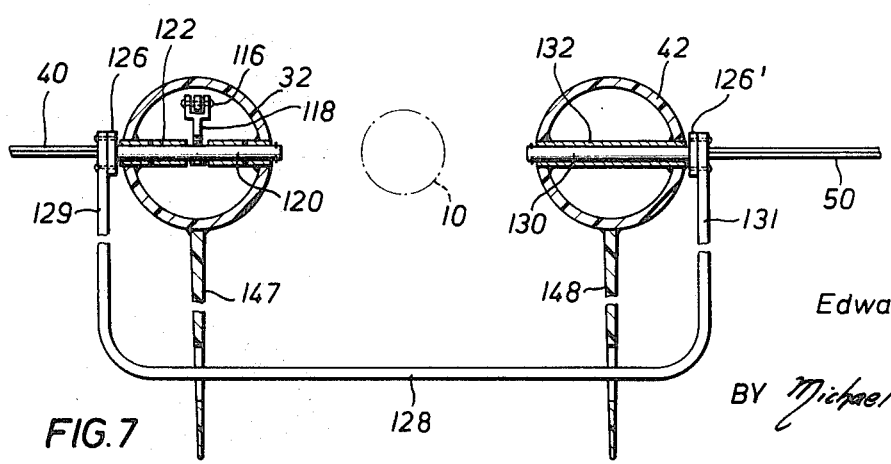
Edward B. Tickell
INVENTOR
BY Michael P. Breston
ATTORNEY

United States Patent Office  3,531,762
Patented Sept. 29, 1970

3,531,762
DEPTH CONTROLLERS FOR SEISMIC STREAMER CABLES
Edward B. Tickell, Houston, Tex., assignor, by mesne assignments, to Numak, Inc., a corporation of Texas
Filed Dec. 26, 1968, Ser. No. 787,085
Int. Cl. G01v 1/38; B63b 21/56
U.S. Cl. 340—7                           13 Claims

ABSTRACT OF THE DISCLOSURE

This invention relates to apparatus for marine seismic surveying and includes a plurality of depth controllers, each suspended from a section of the towed seismic streamer cable for maintaining the cable within predetermined depth levels. The suspension permits the cable and the frame of the depth controller to freely rotate relative to each other and to swing relative to each other in a limited arc. Depth regulating means on the frame effectively maintain the controller within predetermined water depth levels.

BACKGROUND OF THE INVENTION

The art of marine surveying by the use of seismic waves has recently achieved very considerable importance and various methods and apparatus for conducting marine seismic surveying operations are well known to the art. A considerable amount of such work has been conducted in relatively shallow water in coastal regions. In conducting seismic surveying operations in such shallow water, for instance up to 15 or 20 feet in depth, it has been the practice to lower the streamer cable nearly to the floor of the body of water or to maintain it by suitable surface floats. However, this technique is not entirely satisfactory for operations conducted in relatively deep waters, say at levels between 25 and 100 feet. In these relatively deep water seismic operations it becomes troublesome and time consuming to suspend the cable from surface floats and to attach suitable weights to the cable as is common practice in the art.

The seismic wave energy reflected upwardly by subsurface formations is received at several detector stations in the streamer cable, converted into electrical energy, and suitably recorded. Care must be exercised to avoid errors in subsequent computations resulting from excessive variations in the depth levels of the various detectors housed by the streamer cable.

As would be expected, the wave action on the above-mentioned depth controllers may tend to increase the noise level often to such an extent that the noise-to-signal ratio may exceed acceptable limits. The problem presented by relatively high noise-to-signal ratios is especially severe in seismic operations conducted at a considerable distance from shore, since higher noise levels may require larger or a greater number of energy sources, the handling of which in rough waters or weather is time consuming, difficult and sometimes dangerous.

More recently seismic cable depth controllers have been proposed and used which are less time consuming to couple to the cable, and which do not require surface supports. It was found however, among other things, that in field use these recent controllers were relatively fragile and their moving parts which were continuously exposed to salt water, became either corroded or subject to frequent operational failures. These recent controllers employed the same pair of surfaces both for rotating in response to a depth level variation and for developing the necessary lift forces. As a result the forces required to move these surfaces were relatively large necessitating both a relatively big pressure-to-force transducer and controller. Also since these recent depth controllers were only free to roll about the cable, they frequently bent the cable in a vertical plane when subjected to cross-current water waves producing pitching moments about their center of gravity, thereby introducing spurious noises into the detectors housed by the cable and/or damaging the cable itself. Moreover, these recent depth controllers were fastened in series to the cable and cast overboard with the cable and it frequently happened that at least one depth controller would roll over several times and would reach surface bottom-side-up. When that happened the operator had to reel in at least a portion of the streamer cable while decoupling the depth controllers between the vessel and the controller whose attitude was defective, correct its attitude, and recouple the depth controllers as the cable was again payed out.

By way of summary it can be generally stated that among other things prior art depth controllers were found: to introduce spurious electric noises into the detectors of the streamer cable, to be relatively large and cumbersome to manipulate, to be relatively expensive to manufacture, to be relatively fragile in field use, to cause the cable to bend or twist, to cause the cable to sink under certain adverse conditions, to offer appreciable drag, to create considerable turbulence in the water flow around the cable, and to be relatively unstable under varying field conditions.

SUMMARY OF THE INVENTION

The present invention contemplates broadly new and improved depth controllers which can be loosely suspended from and attached to seismic streamer cables. The suspension permits free rotation about a roll axis and limited rotation about a pitch axis, thereby significantly reducing the moments and forces acting on the cable and their tendency to develop noise.

An illustrative preferred embodiment of this invention comprises a frame having two longitudinal subassemblies, positioned on opposite lateral sides of the cable, and maintained relative to each other by a lateral support subassembly. Depth control means which may include fixed and movable laterally extending surfaces are symmetrically attached to the frame. The movable surfaces are movable from a maximum descending angular position to a maximum ascending angular position in dependence on the depth of the controller in the water. A suitable suspension couples the controller's frame to the cable in a manner which permits the cable and the frame to be susceptible of having relative free roll and limited pitch, i.e., to rotate freely relative to each other about a longitudinal roll axis and to swing relative to each other in a limited arc about a lateral pitch axis.

It is a broad object of this invention to provide improved means for placing and maintaining in water seismic streamer cables at predetermined depth levels.

A further object of this invention is to achieve effective reduction of noise by efficiently submerging and maintaining streamer cables at predetermined water depth levels.

Other objects of this invention aim at providing new and improved seismic cable depth controllers which: are relatively inexpensive to manufacture; are relatively easy to secure to the cable; are compact, lightweight and dynamically stable; have a low self-generated noise characteristic; maintain the suspended portion of the cable in a substantially horizontal attitude over a relatively wide range of towing speeds; and are relatively unresponsive to extraneous cross-currents and wave motions.

Other objects and advantages of this invention will become apparent from the following description, when taken in connection with the accompanying drawings in which.

Figure 12:
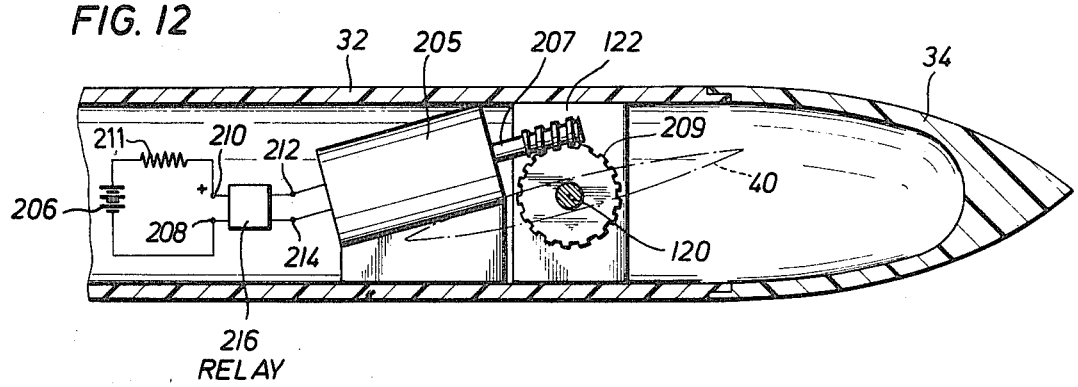
Figure 6:
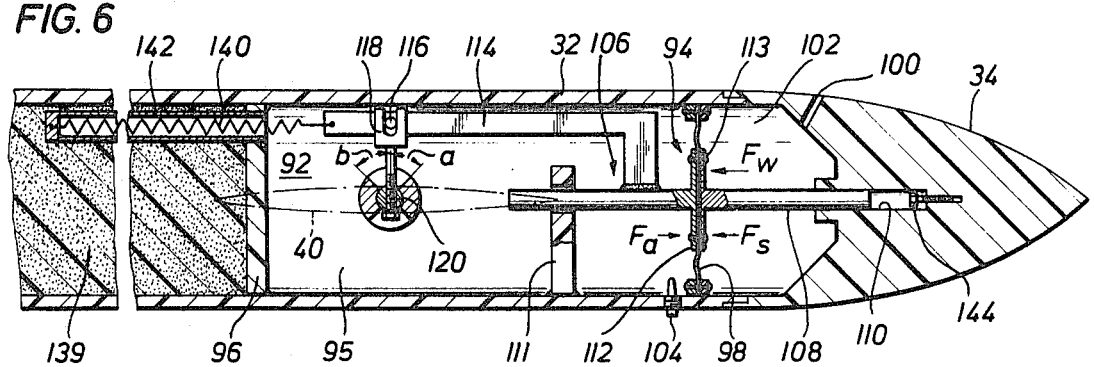
Figure 3:
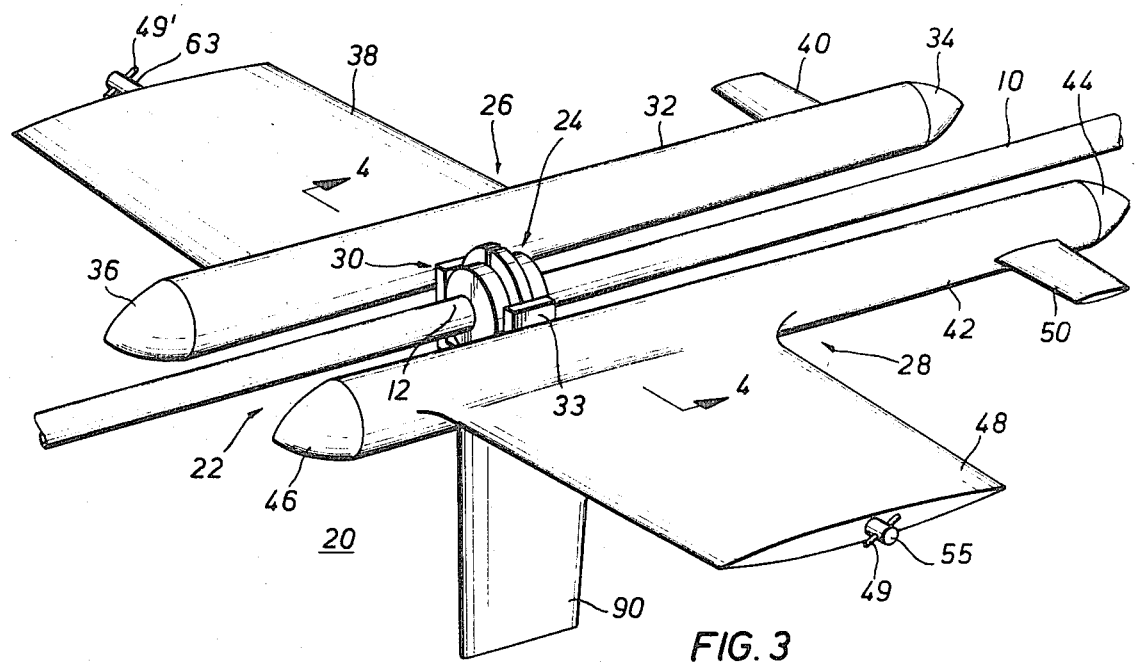
FIG. 3 shows a top view in perspective of a preferred embodiment of the depth controller.
Figure 4A:
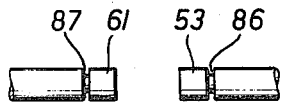
Figure 4:
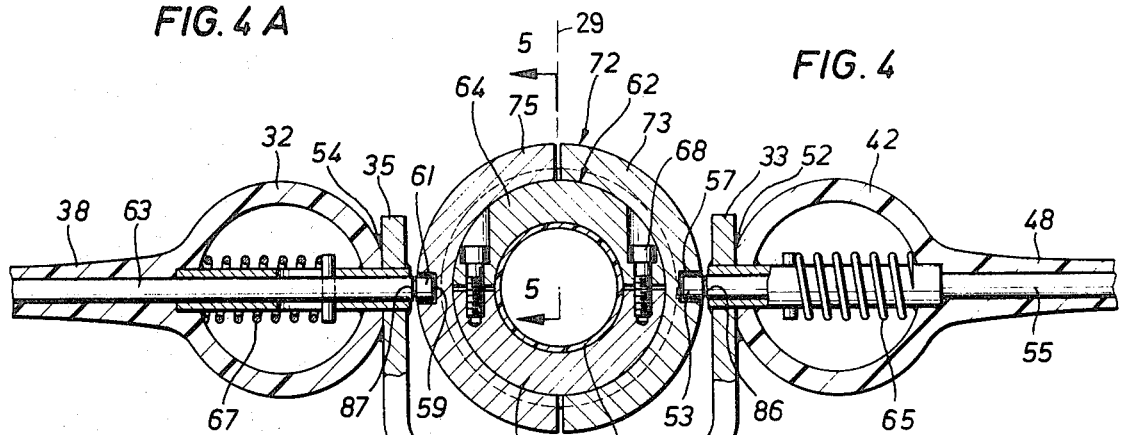
Figure 5:
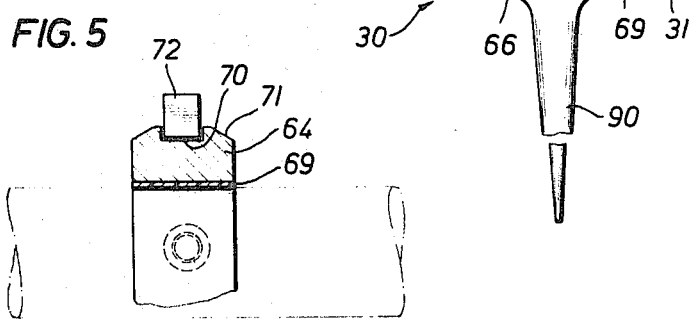

FIGS. 4 and 5 are sectional views taken in FIG. 3 along lines 4—4 and 5—5, respectively;

FIG. 4A shows a detail of FIG. 4;

FIG. 6 shows one type of drive mechanism for the rotating surfaces in the controller of FIG. 3;

FIG. 7 shows a top view in perspective of the movable surfaces in the controller of FIG. 3 when actuated by the drive mechanism of FIG. 6;

FIGS. 8–11 show another type of drive mechanism for the rotating surfaces in the controller of FIG. 3; and FIG. 12 shows a still further embodiment of the drive mechanism.

In the drawings similar reference characters denote corresponding parts throughout the several views.

Figure 1:
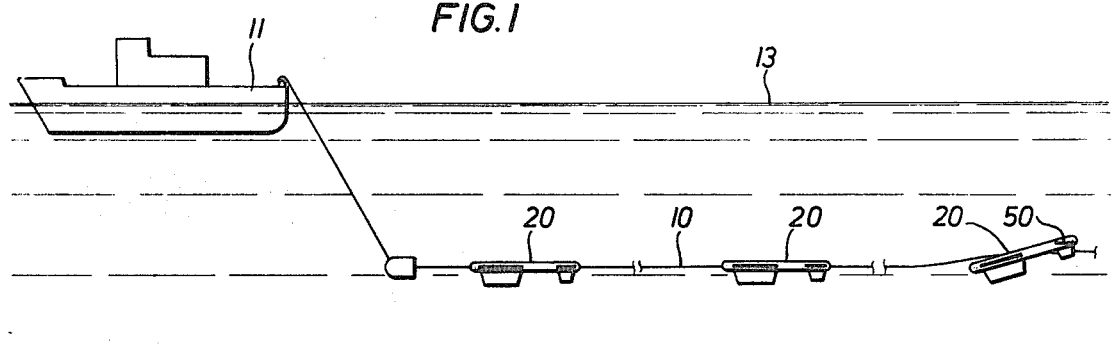
FIG. 1 shows schematically a towed streamer cable coupled to the depth controllers and maintained at a predetermined depth.
Figure 2:
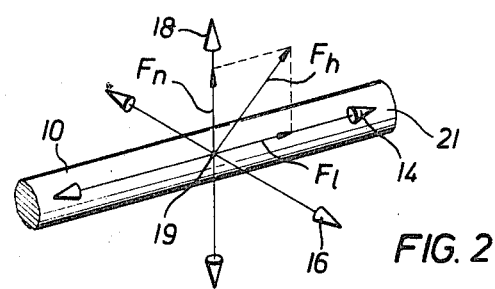
FIG. 2 is a detail view of a segment of the streamer cable with certain forces acting thereon.

Referring to FIGS. 1 and 2, a plurality of depth controllers generally designated as 20 are attached in series to a streamer cable 10 which houses arrays of detectors (not shown) for receiving reflected seismic signals. Cable 10 is towed under tension by a carrier or boat 11 in a direction substantially parallel to the surface 13 of the body of water undergoing seismic investigations. Seismic streamer cables per se are described, for example, in U.S. Pat. Nos. 2,465,696 and 3,299,397. A seismic streamer cable 10 is relatively very long. However the motion of any segment 12 of cable 10 to which a depth controller 20 is attached can be described in space geometry in relation to the segment's longitudinal axis 14, lateral axis 16 and normal axis 18, all intersecting at a center 19, hereinafter called "the center of attachment."

Typically cable 10 is made of an outer flexible tubular housing or jacket 21 containing arrays of hydrophones, reinforcing rods, pressure gauges, and other like transducers (not shown) and is filled with a suitable fluid. Since jacket 21 is flexible and pressure responsive, any depth controller coupled to the cable should impose a minimum load on the cable. Moreover, hydrodynamic forces $F_h$ acting on the segment 12 should be limited to and pass through the center of attachment 19 and should have a vertical (lift) component $+F_n$ or $-F_n$ on the normal axis 18, and a longitudinal component $F_L$ on the longitudinal axis 14 (the normal buoyancy and gravity forces are not shown).

Referring to FIGS. 3 through 5, the depth controller 20 has a streamlined frame, generally designated as 22, supporting a suspension 24 for maintaining segment 12 of towed cable 10 within a predetermined depth range in the body of water.

Frame 22 includes two longitudinal subassemblies 26, 28, symmetrically disposed on either side of cable 10, parallel to a vertical plane embracing axes 14 and 18, and supported by a lateral support sub-assembly 30 bridging the longitudinal subassemblies 26, 28 below segment 12. Frame 22 can be made of suitable rigid, noncorrosive materials such as stainless steel alloys, plastic, wood or combinations thereof. For ease of construction from conventional parts, subassembly 26 is made of an elongated tubular member 32 having streamlined tail and front end plugs 34, 36 respectively. Extending outwardly and laterally from, and fixedly secured to or forming integral part with, the front end of tube 32 is a surface 38 and extending outwardly and laterally from the tail end of tube 32 is a movable surface 40. Subassembly 28 similarly, and symmetrically relative to a vertical plane 29 passing through the center of attachment 19, includes a tubular member 42, end plugs 44, 46, surface 48 fixedly secured to tube 42 and surface 50 movably attached to tube 42. The lateral support subassembly 30 includes preferably a U-shaped bracket 31 for added rigidity. Tube 42 is fixedly secured to one leg 33 and tube 32 is fixedly secured to the other leg 35 of bracket 31, as by welding or gluing at 52, 54 respectively.

To allow cable 10 to have bi-directional freedom of movement relative to frame 22, the suspension 24 is provided with a coupling member 62 fixedly secured to and extending longitudinally on the outer jacket 21 at the desired segment of attachment 12 on cable 10. Coupling 62 may be made conveniently of two semicylindrical portions 64, 66 rigidly fastened to each other and to the outer surface of jacket 21 by screws 68. To reinforce the strength of the wall of segment 12 there is positioned inside of tubular jacket 21 and immediately opposite to coupling 62 a rigid reinforcing sleeve 69. Forces between suspension 24 and cable 10 can therefore be transmitted to each other through coupling 62 and sleeve 69. The outer wall 71 of coupling 62 is provided with a circumferential groove 70 having a substantially U-shaped cross-section adapted to loosely receive and support a releasable yoke member 72, which could be of annular or of rectangular configuration and have two half sections 73 and 75. Coupling 62 may be made of a lightweight metal alloy and yoke 72 of a strong plastic material.

To allow cable 10 to swing or pitch in a limited arc relative to frame 22 that is to allow cable 10 to rotate about a lateral axis, preferably passing through the center of attachment 19, such as axis 16, yoke 72 is rotatably mounted on two laterally extending pivot shafts. Section 73 rotatably receives the tip end 53 of a pivot shaft 55 in a bore 57. A diametrically opposed bore 59 receives the tip end 61 of a pivot shaft 63. Shaft 55 extends through leg 33 of bracket 31, tube 42 and wing 48, as shown. Similarly shaft 63 extends through leg 35, tube 32 and wing 38. Shafts 55 and 63 are spring-biased against yoke 72 by springs 65 and 67, and can be pulled away against the springs bias by handles 49 and 49'.

Rotation of cable 10 about the lateral axis 16 passing through the longitudinal axes of shafts 55, 63 is limited by the laterally extending bracket 31 or by other suitable limiting means. In one embodiment the cable was allowed to swing about an arc sustained by an angle of about 30°, as will be more fully explained hereafter. Thus suspension 24 effectively permits free rotation between cable 10 and frame 22 about the longitudinal axis 14 and limited rotation about the lateral axis 16, while preventing linear movement therebetween by the engagement of yoke 72 inside groove 70. A suitable counterweight, which may be in the form of a keel 90, is secured to the center of bracket 31 extending longitudinally below the center of attachment 19 to furnish frame 22 with the necessary horizontal and vertical stability.

To allow cable 10 to free itself from controller 20, slits 86, 87 are provided in shafts 55, 63, respectively. Thus when an impact force hits controller 20, the cable 10 and yoke 72 would become free of frame 22. Cable 10 would then be allowed to float to the water surface 13.

Referring to FIGS. 6 and 7, to allow control surfaces 40 and 50 to rotate in unison in response to a control signal which could be applied from vessel 11, or in response to a pressure or depth variation from a predetermined depth level, there is provided inside tube 32 a motor assembly generally designated as 92. The motor assembly 92 may include a pressure transducer 94 adapted to change a pressure variation from a balanced condition to an angular displacement of a shaft from a reference angular position. The transducer has an air chamber 95 defined by the cylindrical inner wall of a section or of the entire tube 32, by a cylindrical end wall 96 and by a flexible end wall or diaphragm 98 positioned near the end plug 34. Plug 34 has a plurality of channels or ports 100 for admitting external water pressure into a chamber 102 facing diaphragm 98. Air is admitted inside air chamber 95 by an air valve 104 which may be a standard tire tube valve. To translate the linear displacement of diaphragm 98, in response to a pressure difference across its walls, into a shaft rotation, there is provided a translating mechanism generally designated as 106, which includes: a rod 108, one end of which slidably engages a bore 110 in the center body of plug 34, and the other end is slidably supported by a support member 111 secured to the inner wall of tube 32. To strengthen diaphragm 98 two stiff center plates 112, 113 are provided on both faces of the diaphragm as shown. Suitable fastening means such as screws or bolts secure the various parts together in an air-tight fashion, as shown. Either fixedly or pivotally secured to rod 108 is an L-shaped bracket 114 the free end of which is pivotally attached by a pivot 116 to one end of a pivot arm 118 the other end of which is fixedly mounted on a shaft 120 rotating in a sleeve bearing 122. The external end of shaft 120 has an enlarged head 126 to which is secured one end 129 of a movable U-shaped bracket 128. The other end 131 of bracket 128 is secured to another shaft 130 rotatably supported by a sleeve bearing 132 inside tube 42. The symmetrical arrangement of the parts and the axial alignment of shafts 120 and 130 relative to the vertical plane 29 and the longitudinal axis 14 of cable 10 will be evident from the drawings.

Control surfaces 40 and 50 are fixedly secured to the ends 129, 131, respectively and have a horizontal attitude under balanced or equilibrium conditions in the water at the predetermined depth. A long spring 140, having one end attached to bracket 114 and the other end to an anchor block 142 rotates shaft 120 counterclockwise as viewed in FIG. 6 by the maximum allowed bias angle $b$. When air is applied to the air chamber 95 the air pressure exerts an outward force $F_A$ against the diaphragm 98 tending to push rod 108 outwardly against an adjustable limit stop 144 inside bore 110. The maximum outward rectilinear movement of rod 108 rotates shaft 120 by a maximum clockwise angle $a$ with respect to a transverse plane passing through the longitudinal axis of shaft 120. Tail keels 147 and 149 are provided on tubes 32, 42, respectively both to protect movable bracket 128 which passes through suitable openings in keels 147 and 149, and to act as rest legs together with keel 90 for frame 22.

The inner volume of tubes 32 not occupied by the air chamber 95 and that of tube 42 are filled with a lightweight Styrofoam material 139 to maintain the frame 22 positively buoyant in case water should enter the inner volumes of tubes 32, 42.

In FIGS. 8-11 there is shown a different embodiment of the translating mechanism 106. Surface 40 is fixedly secured to a shaft 150, horizontally and rotatably supported by two sleeve bearings 152, 154 secured to diametrically opposed portions of the inner wall of tube 32. Similarly surface 50 is fixedly secured to a shaft 160, horizontally and rotatably supported by two sleeve bearings 162, 164 secured to diametrically opposite portions of the inner wall of tube 42. Shaft 160 has a center hole 155 for fixedly engaging a pivot arm 156 extending vertically to the longitudinal axis of tube 42. Similiary, a pivot arm 166 is positioned in a center hole 165 in shaft 150.

The free ends of pivot arms 156, 166 are interconnected by flexible but rigid cables 170, 172 preferably made of stainless steel. The cables are supported in tube 32 by a pair of pulleys 174, 176 and in tube 42 by a similar pair of pulleys 178, 180. A pair of generally U-shaped tubes 182, 184 of a diameter slightly larger than the diameter of cables 170, 172 make an air-tight connection between tubes 32, 42 and loosely house and protect the cables 170, 172 from the corrosive effects of salt water. It will be noted from FIG. 9 that tubes 182 and 184 are "crossed" to allow surfaces 40 and 50 to rotate in unison, as if shafts 150 and 160 were fixedly interconnected to each other or formed a single shaft.

Pulleys 174, 176 are rotatably mounted on a shaft 190 and pulleys 178, 180 are rotatably mounted on a shaft 192. One end 193 of shaft 192 fixedly supports a worm gear 194 which engages a worm 196 the rotation of which is controlled by a suitable motor 198. Motor 198 can be an electric motor powered by a local battery, or by remote power supplied from vessel 11. On the other hand, preferably motor 198 includes an air prassure chamber and a movable diaphragm the linear displacement of which is translated, similar to the translating mechanism shown in FIG. 6, into an angular rotation of worm 196.

To prevent cable 170 from sliding on the rim of pulley 178, a collar 200 is provided fitting in a notch 202 carved out from the peripheral wall of pulley 178, FIG. 11. The collar 200 is crimped to cable 170 and is positioned, when surfaces 40 and 50 are horizontal with respect to the water surface, at an angle of approximately 45°. Pulley 178 is allowed to rotate about 15° on either side of a 45° reference axis 204. Thus rotation of shaft 196 by motor 198 will result in a rotation of surfaces 40 and 50. The dimensions may be such a rotation of shaft 196 will develope an equal angular rotation of shafts 150, 160.

Referring to FIGS. 12 and 7, it will be appreciated that the movable U-shaped bracket 128 could be driven by an electric motor 205 driving a worm 207 engaging a worm gear 209 which could be secured to shaft 120. The electric power required to drive motor 205 may be supplied from a local battery 206 connected to output terminals 208, 210 through a current limiting resistor 212. Coupled between 208, 210 and the input terminals 211, 214 of motor 205 is a remotely controlled relay 216 which, in response to a signal applied from vessel 11 or from a remotely positioned transducer in streamer cable 10, can connect the positive terminal 210 either to terminal 212 or 214. Depending on the polarity of the applied current to motor 205, worm 207 will rotate either clockwise or counterclockwise thus controlling the angular position of shaft 120 and hence of movable surfaces 40 and 50.

In operation of the controller with the preferred drive mechanism shown in FIG. 6, before each controller 20 is coupled to a segment of cable 10, the air pressure in chamber 95 is adjusted for the desired operating depth level. A suitable calibration chart is usually obtained experimentally to allow the operator to chose the desired air pressure. Of primarily interest here are essentially three forces acting on the diaphragm 98: the outward force $F_a$ resulting from the air pressure being exerted on the surface area of the inner wall of the diaphagm, the inward force $F_s$ exerted by the spring 140, and the inward force exerted by the water pressure $F_w$ against the outer wall of the diaphragm. At equilibrium, $$F_w + F_s = F_s \qquad \text{Equation 1}$$

then controller 20 is at the predetermined depth level. Before the controller is positioned in water, the force $F_a$ being greater than the force $F_s$, causes rod 108 to assume its maximum linear displacement which is limited by the stop 144. The surfaces 40 and 50 then have a descending attitude, that is, they are inclined forwardly and upwardly with respect to the longitudinal axis 14.

As the streamer cable 10 is payed out from the vessel 11, the depth controllers 20 are secured to their assigned segments 12 by engaging yoke 72 on one hand with coupling member 64 and on the other hand with pivot shafts 55 and 63. It will be appreciated that the coupling of a controller 20 to a segment 12 can be done almost in a matter of seconds. When controller 20 reaches the water it has a buoyancy which allows it to float nearly completely submerged. The buoyancy of the subassemblies 26, 28 can be adjusted by adding suitable weights to the keels 90, 147 and 149.

As soon as each depth controller is waterborne, a hydrodynamic force $F_h$ becomes developed on each of trail surfaces 40 and 50 as a result of the forward velocity of cable 10. $F_h$ varies with the angle of attack as is well known to those skilled in the art. The angle of attack preferably should not exceed 15° with respect to the horizontal. Force $F_h$ remains substantially normal to surfaces 40 and 50. The vertical components $F_n$ of these hydrodynamic forces $F_h$ cause the rear ends of tubes 32, 42 and hence surfaces 38, 48 secured thereto to pitch negatively, that is the rear ends of tubes 32, 42 become raised relative to a horizontal plane passing through the longitudinal axis 14 of cable 10. Since surfaces 38 and 48 become inclined forwardly and downwardly, hydrodynamic forces become also developed against them, as a result of the forward velocity of cable 10, which cause the depth controlled 20 to dive until it reaches a level wherein Equation 1 holds true. When that happens diaphragm 98 assumes its neutral or rest position, movable surfaces 40, 50 assume a horizontal attitude causing tubes 32, 42 and hence surfaces 38, 48 to also assume a horizontal attitude.

Should cable 10 fall below this predetermined level, the water pressure in chamber 102 will cause the diaphragm 98 to move inwardly, surfaces 40 and 50 to incline forwardly and downwardly, and the depth controller will pitch positively until the predetermined level is reestablished. Similarly should cable 10 rise above the predetermined level the diaphragm 98 will move outwardly by an amount corresponding to the pressure variation between the predetermined level and the new level causing the depth controller to pitch negatively until the predetermined level is again reestablished.

While analytical expressions for determining the various physical parameters necessary to build the depth controller may be derived, the experimental method was found to be more desirable if not more dependable. Among the factors of interest are: the tension in the cable, the controller's inertia moment, the buoyant force, the tail lift force which depends on the area of movable surfaces 40 and 50, the maximum allowed pitch angle, the drag force on the tail area as a result of pitching, the frame's pitching moment, the distance from the center of gravity of the frame to the resultant force on the movable surfaces, and the velocity of tow.

To assure that the depth controller 20 will be stable over a wide range of operating conditions, it is desired that the static and dynamic forces acting on the depth controller, such as buoyancy, gravity, drag, and hydrodynamic forces, be resolvable into a horizontal component lying on an axis parallel to the longitudinal axis 14, and into a vertical component lying on an axis parallel to the normal axis 18.

Since it is desired to actuate movable surfaces 40 and 50 in substantial synchronism for balanced operation, the rotatable shafts 120 and 130 are mechanically ganged by the bracket 128, which makes shaft 120 a driving shaft and shaft 130 a driven shaft. If desired two motor assemblies 92 may be provided, one inside tube 32 and the other inside tube 42. After proper calibration movable surfaces 40 and 50 will move in substantial synchronism for all practical purposes, even without bracket 128. When bracket 128 is employed, its distance from the horizontal position of cable 10 should be sufficiently great to allow cable 10 to swing through its entire allowed arc which ordinarily need not be greater than that sustained by an angle of 15° from the center of attachment 19.

Referring to the operation with the driving mechanism shown in FIGS. 8 through 11, rotation of the worm 196 by motor 198 in one direction will cause movable surfaces 40 and 50 to rotate in a clockwise direction, and rotation of worm 196 in an opposite direction will cause movable surfaces 40 and 50 to rotate in a counterclockwise direction. Since both shafts 150 and 160 are driving shafts, bracket 128 may be eliminated.

In operation with the drive mechanism shown in FIG. 12, the remote control relay 216 can be actuated by a signal from the vessel 11 to suitably energize motor 205 which drives shaft 120. The nature of the signal will determine the direction of rotation of shaft 120. The remaining operation is similar to that described in connection with the driving mechanism 92 of FIG. 6.

While two movable surfaces 40 and 50 were shown and illustrated, it will be appreciated that a single movable surface, such as that which could be provided by an annular member, fixedly secured to shafts 120, 130 in FIG. 7, or to shafts 150, 160 in FIG. 8, could be employed instead of two. The hydrodynamic forces required to tilt frame 22 would then be developed by the inclined effective surface of the single movable surface. On the other hand, more than two movable surfaces could be employed, if desired.

It will therefore be apparent to those skilled in the art that modifications of the preferred embodiments can be made without departing from the scope of the invention as defined in the appended claims.

What I claim is:

1. A depth control system for controlling the depth at which a long seismic streamer cable is towed in a body of water, said system comprising:
   a plurality of movable surfaces positioned in symmetric pairs relative to a vertical plane extending lengthwise of said cable,
   a plurality of yoke means for movably coupling said surfaces to selected longitudinal stations along said cable,
   a plurality of coupling means to loosely couple said surfaces to said yoke means whereby said cable is allowed to swing in said vertical plane relative to said surfaces,
   depth control means coupled to said surfaces to move said surfaces in response to a condition to thereby develop hydrodynamic forces on said surfaces, and
   means coupled to said surfaces for transferring said forces to said yoke means thereby causing said cable to change its position relative to the surface of said body of water.

2. A depth control system for controlling the depth at which at least one section of a long seismic streamer cable is towed in a body of water, said system comprising:
   a frame extending laterally on either side of said cable;
   movable coupling means including yoke means for loosely coupling said frame to said section, whereby said cable is allowed to swing relative to said frame in a vertical plane extending lengthwise of said cable;
   at least one surface movably mounted on said frame;
   depth control means coupled to said surface and adapted to moving said surface in response to a condition to thereby develop hydrodynamic forces on said surface, and
   said forces causing said section to change its position relative to the surface of said body of water.

3. The depth control system of claim 2 wherein said yoke means is divisible along its length to removably secure said frame to said section.

4. The depth controller of claim 2 wherein said frame has at least one weak member adapted to free said frame from said cable under predetermined operating conditions.

5. The depth control system of claim 2 and further including at least another surface movably mounted on said frame,
   said movable surfaces being mounted on respective coaxial shafts journaled normal to said plane, and
   the axes of said shafts being at a predetermined distance from said yoke means to provide moment arms for said forces.

6. The depth control system of claim 5 wherein said shafts are driven in synchronism by said depth control means.

7. The depth control system of claim 2 wherein said frame further includes a pair of fixed surfaces extending laterally and symmetrically on both sides of said cable.

8. The depth control system of claim 7 wherein:
said frame further includes two longitudinal tubular members each having a streamlined configuration,
said depth control means includes at least one pressure transducer adapted to convert a change in water pressure into a force for moving said movable surface, and
said pressure transducer including an air chamber having a movable wall responsive both to the pressure exerted by the air in said chamber and to the external water pressure at the depth at which said section is being towed.

9. The depth control system of claim 8 and further including:
a lateral member fixedly maintaining said longitudinal members, and
stabilizing means connected to said lateral member for providing said frame with horizontal stability.

10. The system of claim 2 and further including force transfer means coupled to said surface for transferring said forces from said surface to said yoke means.

11. The depth control system of claim 10 wherein said force transfer means include,
at least one pivot shaft journaled to said frame and having a pivot axis substantially normal to said plane, and
said pivot axis having a predetermined distance from said yoke means to provide a moment arm for the transfer of said forces.

12. The depth control system of claim 10 wherein said force transfer means includes,
at least one lateral surface extending from said frame for developing normal forces when said frame becomes inclined relative to said cable in response to said hydrodynamic forces, and
said normal forces acting on said yoke means to cause said change in position.

13. The depth control system of claim 12 wherein said coupling means includes a cylindrical bearing adapted to rotatably support said yoke means and to secure said frame onto said section against movement of said frame along said cable.

References Cited

UNITED STATES PATENTS

| | | | |
|---|---|---|---|
| 3,372,666 | 3/1968 | Baker | 340—7 X |
| 3,375,800 | 4/1968 | Cole et al. | 340—7 X |

RODNEY D. BENNETT, Jr., Primary Examiner

D. C. KAUFMAN, Assistant Examiner

U.S. Cl. X.R.

114—235